United States Patent
Chopra et al.

(10) Patent No.: US 12,230,756 B2
(45) Date of Patent: Feb. 18, 2025

(54) BIODEGRADABLE ELECTROCHEMICAL DEVICE AND METHODS THEREOF

(71) Applicant: XEROX CORPORATION, Norwalk, CT (US)

(72) Inventors: Naveen Chopra, Oakville (CA); Gregory McGuire, Oakville (CA); Edward G. Zwartz, Mississauga (CA); Nan-Xing Hu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 184 days.

(21) Appl. No.: 17/652,935

(22) Filed: Mar. 1, 2022

(65) Prior Publication Data

US 2023/0282879 A1    Sep. 7, 2023

(51) Int. Cl.
   *H01M 10/0565*    (2010.01)
   *H01M 4/62*       (2006.01)

(52) U.S. Cl.
   CPC ....... *H01M 10/0565* (2013.01); *H01M 4/622* (2013.01); *H01M 2300/0085* (2013.01); *H01M 2300/0091* (2013.01)

(58) Field of Classification Search
   CPC ............. H01M 10/0565; H01M 4/622; H01M 2300/0085; H01M 2300/0091; H01M 6/22; H01M 6/40
   See application file for complete search history.

(56) References Cited

U.S. PATENT DOCUMENTS

| | | | |
|---|---|---|---|
| 2013/0042467 A1* | 2/2013 | Sanada | H01M 10/058 29/623.5 |
| 2019/0237803 A1* | 8/2019 | Gerasopoulos | H01M 10/0525 |
| 2021/0151263 A1* | 5/2021 | Noshadi | H01G 11/36 |
| 2021/0408592 A1* | 12/2021 | Agrawal | C08K 5/0016 |

FOREIGN PATENT DOCUMENTS

| | | |
|---|---|---|
| CA | 3151018 A1 | 2/2021 |
| WO | 2019/161301 A1 | 8/2019 |
| WO | 2021/034899 A1 | 2/2021 |
| WO | 2021/034899 A8 | 2/2021 |

OTHER PUBLICATIONS

Spingler, Franz (EP Examiner), Extended European Search Report issued in corresponding European Application No. 23156299.2, 7 pages.
Bowen, Chris (CA Examiner), Requisition by the Examiner in Accordance with Subsection 86(2) of the Patent Rules issued May 22, 2024 in corresponding Canadian Patent Application No. 3,190,652, 4 pages.

* cited by examiner

*Primary Examiner* — Stewart A Fraser
(74) *Attorney, Agent, or Firm* — MH2 Technology Law Group LLP (57) ABSTRACT

An electrochemical device is disclosed, which includes an anode and a cathode. The electrochemical device also includes an extruded electrolyte composition disposed between the anode and the cathode. The cathode and/or the anode of the electrochemical device may be disposed in a stacked geometry or in a lateral x-y plane geometry. The (Continued)

electrolyte composition may include a gel polymer electrolyte. The electrolyte composition is disposed between the anode and the cathode in a laterally non-continuous pattern. A method of producing an electrolyte layer of an electrochemical device is also disclosed.

7 Claims, 7 Drawing Sheets

BIODEGRADABLE ELECTROCHEMICAL DEVICE AND METHODS THEREOF

TECHNICAL FIELD

The presently disclosed examples or implementations are directed to biodegradable electrochemical devices, electrolytes thereof, and fabrication methods for the same.

BACKGROUND

The number of batteries being produced in the world is continuously increasing as a consequence of the growing need for portable and remote power sources. Particularly, a number of new technologies require batteries to power embedded electronics. For example, embedded electronics, such as portable and wearable electronics, Internet of Things (IoT) devices, patient healthcare monitoring, structural monitoring, environmental monitoring, smart packaging, or the like, rely on batteries for power. While conventional batteries may be partially recycled, there are currently no commercially available batteries that are environmentally friendly or biodegradable. As such, an increase in the manufacture and use of conventional batteries results in a corresponding increase in toxic and harmful waste in the environment if not properly disposed of or recycled. In view of the foregoing, there is a need to develop improved biodegradable batteries; especially for applications that utilize disposable batteries for a limited time before being discarded.

Further, to meet the demand for flexible, low-cost, medium or low performance batteries, all-printed batteries have been developed. Some of these all-printed batteries use a GPE (gel polymer electrolyte) in lieu of a paper or fleece material soaked with aqueous solution. Advantages of a GPE layer include ease of manufacturing, improved structural integrity, flexibility, and more consistent performance. Current methods of screen printing the curable GPE material are challenged by issues such as non-uniform thickness, inadequate pile height, and air bubbles in the film. Non-uniform thickness may lead to buckling in all-printed battery structure. Inadequate pile height in a battery may lead to short circuits, and air bubbles in the film may result in poor film uniformity in the battery structure and irregular performance.

There is a need for processes to create biodegradable gel polymer electrolyte layer with good fidelity (bubble-free, adequate thickness, and uniform pile height), and batteries made using such processes.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An electrochemical device is disclosed. The electrochemical device includes an anode and a cathode. The electrochemical device also includes an extruded electrolyte composition disposed between the anode and the cathode. Implementations of the electrochemical device may include where the cathode and/or the anode are disposed in a stacked geometry. The cathode and/or the anode may be disposed in a lateral x-y plane geometry. The electrolyte composition may include a gel polymer electrolyte. The gel polymer electrolyte may include a hydrogel of a copolymer and a salt dispersed in the hydrogel of a copolymer. The electrolyte composition may include a crosslinker. The electrolyte composition may include a photoinitiator. The photoinitiator may include lithium phenyl-2,4,6-trimethylbenzophoosphinate. The electrolyte composition is disposed between the anode and the cathode in a laterally non-continuous pattern.

Another electrochemical device is disclosed. The electrochemical device includes an anode and a cathode. The electrochemical device may include a non-screen printed electrolyte composition disposed between the anode and the cathode.

A method of producing an electrolyte layer of an electrochemical device is disclosed. The method of producing an electrolyte layer of an electrochemical device also includes preparing a substrate for an electrochemical device, the substrate having an electrode. The method of producing an electrolyte layer of an electrochemical device also includes dispensing an electrolyte composition from an extrusion dispenser onto the substrate and in contact with the electrode. The method of producing an electrolyte layer of an electrochemical device also includes curing the electrolyte composition.

Implementations of the method of producing an electrolyte layer of an electrochemical device may include where the electrolyte composition includes a gel polymer electrolyte, which may further include a hydrogel of a copolymer and a salt dispersed in the hydrogel of a copolymer. The electrolyte composition may include a diluent to adjust a viscosity of the electrolyte composition. The electrolyte composition may have a viscosity from about 1,000 cp to about 100,000 cp. The electrolyte composition may include a photoinitiator, such as lithium phenyl-2,4,6-trimethylbenzophoosphinate. The method of producing an electrolyte layer of an electrochemical device may include mixing the electrolyte composition prior to dispensing electrolyte composition. The electrolyte composition may be dispensed according to a specific pattern. The method of producing an electrolyte layer of an electrochemical device may include pausing to allow the electrolyte composition to coalesce under ambient conditions after dispensing. Curing may include subjecting the electrolyte composition to ultraviolet radiation.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

It should be noted that some details of the figures have been simplified and are drawn to facilitate understanding of the present teachings rather than to maintain strict structural accuracy, detail, and scale.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes examples containing A, B, or C, multiple examples of A, B, or C, or combinations of A/B, A/C, B/C, A/B/B/ B/B/C, A/B/C, etc. In addition, throughout the specification, the meaning of "a," "an," and "the" include plural references. The meaning of "in" includes "in" and "on."

Reference will now be made in detail to exemplary examples of the present teachings, examples of which are illustrated in the accompanying drawings. Wherever possible, the same reference numbers will be used throughout the drawings to refer to the same, similar, or like parts.

A biodegradable electrochemical device is disclosed herein. As used herein, the term "biodegradable" or "biodegradable material" may refer to a material, component, substance, device, or the like, capable of or configured to be decomposed by living organisms, particularly microorganisms in a landfill within a reasonable amount of time. The material, component, substance, device, or the like may be decomposed into water, naturally occurring gases like carbon dioxide and methane, biomass, or combinations thereof. As used herein, the expression "biodegradable electrochemical device" or "biodegradable device" may refer to an electrochemical device or a device, respectively, where at least one or more components thereof is biodegradable. In some instances, a majority or substantial number of the components of the biodegradable electrochemical device or the biodegradable device are biodegradable. In other instances, all of the polymer components of the biodegradable electrochemical device or the biodegradable device are biodegradable. For example, the polymers and/or other organic-based components of the electrochemical device are biodegradable while the inorganic materials of the electrochemical device disclosed herein, including the metals and/ or metal oxides, may not be biodegradable. It should be appreciated that if all polymer and/or organic-based components of an electrochemical device are biodegradable, it is generally accepted that the complete electrochemical device is considered biodegradable. As used herein, the term "compostable" may refer to items that are able to be made into compost or otherwise disposed of in a sustainable or environmentally friendly manner. Compostable materials may be considered to be a subset category of biodegradable materials wherein additional specific environmental temperatures or conditions may be needed to break down a compostable material. While the term compostable is not synonymous with biodegradable, they may be used interchangeably in some instances, wherein the conditions necessary to break down or decompose a biodegradable material are understood to be similar to the conditions necessary to break down a compostable material. As used herein, the term or expression "electrochemical device" may refer to a device that converts electricity into chemical reactions and/or vice-versa. Illustrative electrochemical devices may be or include, but are not limited to, batteries, die-sensitized solar cells, electrochemical sensors, electrochromic glasses, fuel cells, electrolysers, or the like.

As used herein, the term or expression "environmentally friendly electrochemical device" or "environmentally friendly device" may refer to an electrochemical device or device, respectively, that exhibits minimal, reduced, or no toxicity to the ecosystems or the environment in general. In at least one embodiment, the electrochemical devices and/or components thereof disclosed herein are environmentally friendly.

As used herein, the term or expression "film" or "barrier layer" may refer to a thin, partially or substantially plastic and/or polymeric material that may be used in various electrochemical device components or parts, including, but not limited to substrates, connections, enclosures, barriers, or combinations thereof. Films as described herein may be rigid or flexible, depending upon the inherent physical properties or dimensions of their respective compositions. In at least one embodiment, these films or barrier layers may be environmentally friendly or biodegradable As used herein, the term or expression "enclosure," "barrier," or "water vapor barrier" may refer to materials utilized in partially sealed, fully sealed or otherwise used to prevent moisture, water or other evaporable materials from entering or exiting via the barrier of an electrochemical device. In at least one embodiment, these enclosures may be environmentally friendly or biodegradable.

In at least one embodiment, the electrochemical device disclosed herein may include an anode, a cathode (i.e., a current collector and/or an active layer), and one or more electrolyte compositions (e.g., a biodegradable solid aqueous electrolyte composition). In another embodiment, the biodegradable electrochemical device may further include one or more substrates, one or more seals, one or more packages, one or more pouches, one or more enclosures, or combinations thereof.

The electrochemical devices disclosed herein may be flexible. As used herein, the term "flexible" may refer to a material, device, or components thereof that is capable of being bent around a predetermined radius of curvature without breaking and/or cracking. The biodegradable electrochemical devices and/or the components thereof disclosed herein may be bent around a radius of curvature of about 30 cm or less, about 20 cm or less, about 10 cm or less, about 5 cm or less without breaking or cracking.

Exemplary examples of an extruded electrolyte composition may include compositions as described herein, and can be included in an electrochemical device, such as a battery, or a biodegradable battery. Alternate examples of devices or apparatus including an extruded electrolyte composition as described herein may include, but are not limited to, carbon capture or carbon dioxide reduction devices, galvanic cells, or electrolyzers. While an electrolyzer is a system that can utilize electricity to break water into hydrogen and oxygen in an electrolysis process, other systems that enact a chemical process with the use of electricity may incorporate extruded electrolyte compositions as described herein.

Figure 1:
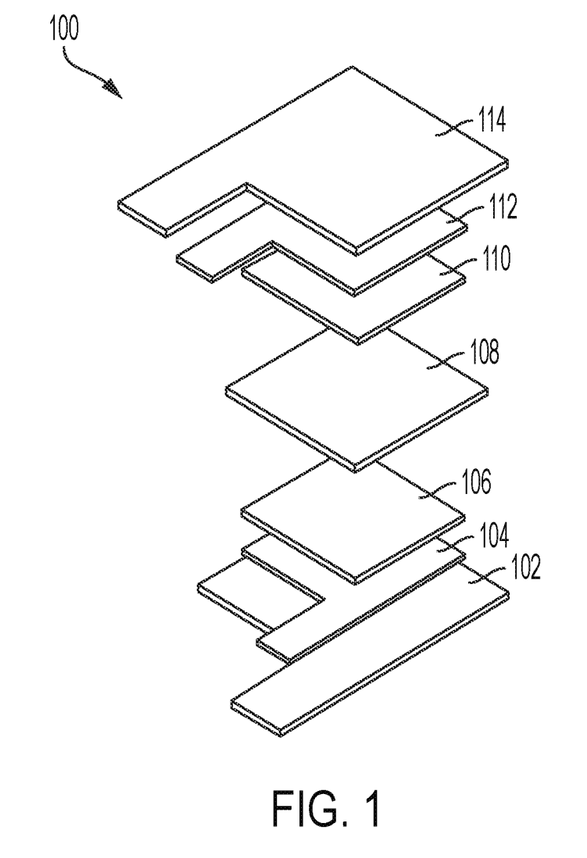
FIG. 1 illustrates an exploded view of an exemplary electrochemical device in a stacked configuration, in accordance with the present disclosure.

FIG. 1 illustrates an exploded view of an exemplary electrochemical device in a stacked configuration, in accordance with the present disclosure. As illustrated in FIG. 1, the electrochemical device 100 may include a first substrate 102, a first current collectors 104 disposed adjacent to or on top of the first substrate 102, an anode active layer 106 disposed adjacent to or on top of the first current collector 104, an electrolyte layer 108 disposed adjacent to or on top of the anode 106, a cathode active layer 110 disposed adjacent to or on top of the electrolyte composition 108, a second current collector 112 disposed adjacent to or on top of the cathode active layer 110, and a second substrate 114 disposed adjacent to or on top of the second current collector 112. It should be appreciated that the first current collector 104 and the anode active layer 106 may be collectively referred to herein as an anode of the electrochemical device 100. It should further be appreciated that the second current collector 112 and the cathode active layer 110 may be collectively referred to herein as a cathode of the electrochemical device 100. As illustrated in FIG. 1, the anode and the cathode of the electrochemical device 100 may be arranged in a stacked configuration or geometry such that the anode and the cathode are disposed on top of or below one another.

In certain examples, the electrochemical device 100 may include one or more seals, not shown here, capable of or configured to hermetically seal the current collectors 104, 106, the anode active layer 106, the cathode active layer 110, and the electrolyte composition 108 between the first and second substrates 102, 114 of the electrochemical device 100. In another example, the electrochemical device 100 may be free or substantially free of seals, as shown in FIG. 1. For example, the substrates 102, 114 may be melted or bonded with one another to seal the electrochemical device 100. In still other examples, each of the current collectors 104, 106, may include a respective tab that may extend outside the body of the electrochemical device 100 to thereby provide connectivity. In some examples, the electrochemical device 100 may be arranged in a side-by-side or coplanar configuration. Further, the anode and the cathode of the electrochemical device 100 may be coplanar such that the anode and the cathode are arranged along the same X-Y plane.

In at least one example, any one or more of the substrates of the electrochemical device 100 may be or include, but is not limited to, a biodegradable substrate. Illustrative biodegradable substrates may be or include, but are not limited to, one or more of polylactic acid (PLA), polylactic-co-glycolic acid (PLGA), silk-fibroin, chitosan, polycaprolactone (PCL), polyhydroxybutyrate (PHB), rice paper, cellulose, or combinations or composites thereof.

The biodegradable substrates of the respective biodegradable electrochemical devices 100 may be stable at temperatures of from about 50° C. to about 150° C. As used herein, the term "stable" or "stability" may refer to the ability of the substrate to resist dimensional changes and maintain structural integrity when exposed to temperature of from about 50° C. to about 150° C. For example, the biodegradable substrates may be capable of or configured to maintain structural integrity with dimensional changes of less than about 20%, less than about 15%, or less than about 10% after exposure to temperatures of from about 50° C. to about 150° C. In one example, each of the biodegradable substrates may be stable (e.g., dimensional changes less than 20%) at a temperature of from about 50° C., about 60° C., about 70° C., about 80° C., about 90° C., about 100° C., or about 110° C. to about 120° C., about 130° C., about 140° C., or about 150° C. In another example, each of the biodegradable substrates may be stable at a temperature of at least 100° C., at least 105° C., at least 110° C., at least 115° C., at least 120° C., at least 125° C., at least 130° C., at least 135° C., at least 140° C., or at least 145° C. In at least one embodiment, the biodegradable substrates may be stable at temperatures of from about 50° C. to about 150° C. for a period of from about 5 min to about 60 min or greater. For example, the biodegradable substrates may be stable at the aforementioned temperatures for a period of time from about 5 min, about 10 min, about 20 min, or about 30 min to about 40 min, about 45 min, about 50 min, about 60 min, or greater.

In at least one embodiment, the biodegradable substrate is weldable, bondable, and/or permanently thermo-sealable without the use of an additional adhesive. For example, the biodegradable substrates of each of the substrates 102, 114 may be weldable and/or bondable with one another without the use of respective seals. Illustrative biodegradable substrates that may be weldable and/or bondable with one another may be or include, but are not limited to, thermoplastics, such as polylactic acid (PLA), polylactides modified with a nucleating agent to enhance crystallinity, such as polylactide polybutylene succinate (PBS), polybutylene adipate terephthalate (PBAT), blends of PLA and polyhydroxybutyrate (PHB), PHB-based blends, or the like, or combinations thereof. As used herein, the term or expression "bondable," "weldable," and/or "permanently thermo-sealable" may refer to an ability of a material (e.g., substrate) to heat seal two surfaces with one another or permanently join two surfaces with one another via heating or melting.

The anode active layer 106 of exemplary biodegradable electrochemical devices 100 may be or include, but are not limited to, one or more of zinc (Zn), lithium (Li), carbon (C), cadmium (Cd), nickel (Ni), magnesium (Mg), magnesium alloys, zinc alloys, or the like, or combinations and/or alloys thereof. Illustrative anode active layers or materials thereof may be or include, but are not limited, or the like, or combinations thereof. In at least one embodiment, the anode active layer may include zinc oxide (ZnO) in a sufficient amount to regulate or control $H_2$ gassing.

In at least one example, the anode active layer 106 of exemplary biodegradable electrochemical devices 100 may be prepared or fabricated from an anode paste. For example, the anode active layer may be prepared from a zinc anode paste. The anode paste may be prepared in an attritor mill. In at least one embodiment, stainless steel shot may be disposed in the attritor mill to facilitate the preparation of the anode paste. The anode paste may include one or more metal or metal alloys, one or more organic solvents, one or more styrene-butadiene rubber binders, or combinations thereof. In an exemplary embodiment, the anode paste may include one or more of ethylene glycol, a styrene-butadiene rubber binder, zinc oxide (ZnO), bismuth (III) oxide ($Bi_2O_3$), Zn dust, or combinations thereof. Illustrative organic solvents are known in the art and may be or include, but are not limited to, ethylene glycol, acetone, NMP, or the like, or combinations thereof. In at least one embodiment, any one or more biodegradable binders may be utilized in lieu of or in combination with a styrene-butadiene rubber binder.

The cathode active layer 110 of exemplary biodegradable electrochemical devices 100 may be or include, but are not limited to, one or more of iron (Fe), iron (VI) oxide, mercury oxide (HgO), manganese (IV) oxide ($MnO_2$), carbon (C), carbon-containing cathodes, gold (Au), molybdenum (Mo), tungsten (W), molybdenum trioxide ($MoO_3$), silver oxide ($Ag_2O$), copper (Cu), vanadium oxide ($V_2O_5$), nickel oxide (NiO), copper iodide ($Cu_2I_2$), copper chloride (CuCl), or the like, or combinations and/or alloys thereof. In an exemplary example, the cathode active layer 110 may include manganese (IV) oxide. The carbon and/or carbon-containing cathode active layers may be utilized in aqueous metal-air batteries, such as zinc air batteries.

In at least one example, the cathode active layer 110 may include one or more additives capable of or configured to at least partially enhance the electronic conductivity of the cathode active layer 110. Illustrative additives may be or include, but are not limited to, carbon particles, such as graphite, carbon nanotubes, carbon black, or the like, or the like, or combinations thereof.

In at least one example, the cathode active layer 110 of an exemplary biodegradable electrochemical device 100 may be prepared or fabricated from a cathode paste. For example, the cathode active layer 110 may be prepared from a manganese (IV) oxide cathode paste. The cathode paste may be prepared in an attritor mill. In at least one example, stainless steel shot may be disposed in the attritor mill to facilitate the preparation of the cathode paste. The cathode paste may include one or more metal or metal alloys, one or more organic solvents (e.g., ethylene glycol), one or more styrene-butadiene rubber binders, or combinations thereof. In an exemplary example, the cathode paste may include one or more of ethylene glycol, a styrene-butadiene rubber binder, manganese (IV) oxide ($MnO_2$), graphite, or combinations thereof. Illustrative organic solvents are known in the art and may be or include, but are not limited to, ethylene glycol, acetone, NMP, or the like, or combinations thereof. In at least one example, the one or more organic solvents may be replaced or used in combination with an aqueous solvent, such as water. For example, water may be utilized in combination with manganese (IV) oxide.

The anode and/or cathode paste may have a viscosity of from about 100 cP to about 1E6 cP. For example, the anode and/or cathode paste may have a viscosity of from greater than or equal to about 100 cP, greater than or equal to about 200 cP, greater than or equal to about 500 cP, greater than or equal to about 1,000 cP, greater than or equal to about 1,500 cP, greater than or equal to about 2,000 cP, greater than or equal to about 10,000 cP, greater than or equal to about 20,000 cP, greater than or equal to about 50,000 cP, greater than or equal to about 1E5 cP, greater than or equal to about 1.5E5 cP, greater than or equal to about 2E5 cP, greater than or equal to about 3E5 cP, greater than or equal to about 4E5 cP, greater than or equal to about 5E5 cP, greater than or equal to about 6E5 cP, greater than or equal to about 7E5 cP, greater than or equal to about 8E5 cP, or greater than or equal to about 9E5 cP. In another example, the anode and/or cathode paste may have a viscosity of less than or equal to about 200 cP, less than or equal to about 500 cP, less than or equal to about 1,000 cP, less than or equal to about 1,500 cP, less than or equal to about 2,000 cP, less than or equal to about 10,000 cP, less than or equal to about 20,000 cP, less than or equal to about 50,000 cP, less than or equal to about 1E5 cP, less than or equal to about 1.5E5 cP, less than or equal to about 2E5 cP, less than or equal to about 3E5 cP, less than or equal to about 4E5 cP, less than or equal to about 5E5 cP, less than or equal to about 6E5 cP, less than or equal to about 7E5 cP, less than or equal to about 8E5 cP, less than or equal to about 9E5 cP, or less than or equal to about 1E6 cP.

In at least one embodiment, each of the anodes and the cathodes, or the active layers 106, 110 thereof may independently include a biodegradable binder. The function of the biodegradable binder is to anchor the particles of each of the respective layers together and provide adhesion to the substrate underneath, the respective layers being the anode current collector 104, the cathode current collector 112 the anode active layer 106, the cathode active layer 110, or combinations thereof. Illustrative biodegradable binders may be or include, but are not limited to, one or more of chitosan, polylactic-co-glycolic acid (PLGA), gelatin, xanthan gum, cellulose acetate butyrate (CAB), polyhydroxybutyrate (PHB), or a combination thereof. In at least one embodiment, any one or more of the biodegradable polymers disclosed herein with regard to the electrolyte composition may also be utilized as the biodegradable binder of the anode, the cathode, components thereof, or any combination thereof. As further described herein, the one or more biodegradable polymers may be cross-linked. As such, the biodegradable binders utilized for the anode, the cathode, and/or the components thereof, may include the cross-linked biodegradable binders disclosed herein with regard to the electrolyte composition.

The electrolyte layer 108 of exemplary biodegradable electrochemical devices 100 may be or include an electrolyte composition. The electrolyte composition may utilize biodegradable polymeric materials. The electrolyte composition may be a solid, aqueous electrolyte composition. The solid, aqueous electrolyte composition may be or include a hydrogel of a copolymer and a salt dispersed in and/or throughout the hydrogel. The copolymer may include at least two polycaprolactone (PCL) chains attached with a polymeric center block (CB). For example, the copolymer may be a block copolymer or a graft copolymer including at least two PCL chains coupled with the polymeric center block, such as PCL-CB-PCL. In another example, the copolymer may be a block copolymer or a graft copolymer including at least one or more of polylactic acid (PLA), polyglycolic acid (PGA), polyethylene imine (PEI) or combinations thereof, coupled with the polymeric center block.

The copolymer or the solids may be present in the hydrogel in an amount of from about 5 weight % or greater to 90 weight % or less, based on a total weight of the hydrogel (e.g., total weight of solvent, polymer, and salt). For example, the copolymer may be present in an amount of from about 5 weight % or greater, 10 weight % or greater, 15 weight % or greater, 20 weight % or greater, 25 weight % or greater, 30 weight % or greater, 35 weight % or greater, based on a total weight of the hydrogel. In another example, the copolymer may be present in an amount of from 90 weight % or less, 80 weight % or less, 70 weight % or less, or 60 weight % or less, based on a total weight of the hydrogel. In a preferred embodiment, the copolymer or the solids may be present in the hydrogel in an amount of from about 5 weight % to about 60 weight %, about 5 weight % to about 50 weight %, about 20 weight % to about 40 weight %, or about 30 weight %, based on a total weight of the hydrogel. In yet another preferred embodiment, the copolymer or the solids may be present in the hydrogel in an amount of from greater than 30 weight % to 60 weight %, based on a total weight of the hydrogel.

In certain examples, the electrochemical device includes an extruded electrolyte composition or layer, as dispensed according to one or more methods detailed in the present disclosure. As defined herein, an extruded electrolyte layer provides an electrolyte layer possessing good fidelity, with respect to the extruded electrolyte layer being bubble-free, having adequate thickness as described herein, and being of a uniform pile height. A uniform pile height refers to an electrolyte layer having a consistent thickness across one or more dimensions. Such resulting physical characteristics are advantageous as compared to electrolyte layers that are deposited by other methods, for example, screen printed electrolyte layers in electrochemical devices according to the present disclosure, Certain examples of electrochemical devices according to the present disclosure are also produced by procedures that are non-screen printed methods, as screen printed methods of depositing gel polymer electrolyte layers for such electrochemical devices are known to have issues associated with the procedure, such as non-uniform thickness, inadequate pile height, and air bubbles in the gel polymer electrolyte film. Non-uniform thickness may lead to buckling in all-printed battery structure. Inadequate pile height in a battery may lead to short circuits, and air bubbles in the film may result in poor film uniformity in the battery structure. Methods and gel polymer electrolyte layers deposited according to the methods of the present disclosure, producing exemplary non-screen printed electrolyte composition layers, such as extrusion, molding, and the like do not produce gel polymer electrolyte layers having non-uniform thickness, inadequate pile height, and air bubbles associated with the gel polymer electrolyte film layer.

The copolymer may be present in the hydrogel in an amount sufficient to provide a continuous film or layer that is free or substantially free of bubbles. The copolymer may also be present in the hydrogel in an amount sufficient to provide a viscosity of from about 1,000 cP to about 100,000 cP. For example, the copolymer may be present in the hydrogel in an amount sufficient to provide a viscosity of from about 1,000 cP, about 5,000 cP, about 10,000 cP, or about 20,000 cP to about 30,000 cP, about 40,000 cP, about 50,000 cP, about 75,000 cP, about 90,000 cP, or about 100,000 cP. In certain examples, the viscosity may be as high as 1,000,000 cP, as is known in some anode and cathode battery pastes.

The polymeric center block of the copolymer may be a biodegradable polymer, thereby improving or increasing biodegradability of the solid, aqueous electrolyte composition. The biodegradable polymer of the polymeric center block is preferably naturally occurring. The polymeric center block may be or include, or be derived from, a polymer, such as a biodegradable polymer, including at least two free hydroxyl groups available for reaction with ε-caprolactone. As further described herein, the polymer including the at least two free hydroxyl groups may be reacted with ε-caprolactone to form the copolymer. Illustrative polymers including at least two free hydroxyl groups that may be utilized to form the polymeric center block (CB) may be or include, but are not limited to, one or more of polyvinyl alcohol (PVA), a hydroxyl-bearing polysaccharide, a biodegradable polyester, a hydroxy fatty acid (e.g., castor oil), or the like, or combinations thereof. Illustrative hydroxyl-bearing polysaccharides may be or include, but are not limited to, starch, cellulose, carboxymethyl cellulose, methyl cellulose, hydroxyethyl cellulose, chitin, guar gum, xanthan gum, agar-agar, pullulan, amylose, alginic acid, dextran, or the like, or combinations thereof. Illustrative biodegradable polyesters may be or include, but are not limited to, polylactide, polyglycolic acid, polylactide-co-glycolic acid, polyitaconic acid, polybutylene succinate, or the like, or combinations thereof. In a preferred embodiment, the polymer center block may be or include one or more of polyvinyl alcohol (PVA), a hydroxyl-bearing polysaccharide, a biodegradable polyester, or a hydroxy fatty acid.

In at least one example, the polymeric center block of the copolymer may not be a biodegradable polymer. For example, the polymeric center block of the copolymer may be or include, but is not limited to, polyethylene glycol (PEG), hydroxy-terminated polyesters, hydroxyl-terminated polyolefins, such as hydroxy-terminated polybutadiene, or the like, or combinations thereof.

The copolymer, including at least two polycaprolactone (PCL) chains bonded to the polymeric center block, may be a graft copolymer or a block copolymer. Whether the copolymer is a graft copolymer or a block copolymer may be at least partially determined by the number and/or placement of the at least two free hydroxyl groups of the polymeric center block. For example, reacting ε-caprolactone with polymeric center blocks having the hydroxyl groups on monomers along a length of the polymeric center block chain forms graft copolymers. In another example, reacting ε-caprolactone with polymeric center blocks having each of the hydroxyl groups at respective ends of the polymeric center blocks forms block copolymers. Illustrative block copolymers may be or include triblock copolymers, tetrablock copolymers, star block copolymers, or combinations thereof.

As discussed above, the electrolyte composition may be a solid, aqueous electrolyte composition including the hydrogel of the copolymer and the salt dispersed in the hydrogel. The salt of the hydrogel may be or include any suitable ionic salt known in the art. Illustrative ionic salts may be or include, but are not limited to, one or more of organic-based salts, inorganic-based salts, room temperature ionic liquids, deep eutectic solvent-based salts, or the like, or combinations or mixtures thereof. In a preferred embodiment, the salts are or include salts useable in zinc/manganese (IV) oxide ($Zn/MnO_2$) electrochemistry. Illustrative salts may be or include, but are not limited to, zinc chloride ($ZnCl_2$), ammonium chloride ($NH_4Cl$), sodium chloride (NaCl), phosphate-buffered saline (PBS), sodium sulfate ($Na_2SO_4$), zinc sulfate ($ZnSO_4$), manganese sulfate ($MnSO_4$), magnesium chloride ($MgCl_2$), calcium chloride ($CaCl_2$), ferric chloride ($FeCl_3$), lithium hexafluorophosphate ($LiPF_6$), potassium hydroxide (KOH), sodium hydroxide (NaOH), or the like, or combinations thereof. In a preferred embodiment, the salt of the electrolyte composition may be or include ammonium chloride ($NH_4Cl$), zinc chloride ($ZnCl_2$), or a combination or mixture thereof. In another embodiment, the salt may be or include alkali metal salts, such as sodium hydroxide (NaOH), ammonium hydroxide ($NH_4OH$), potassium hydroxide (KOH), or combinations or mixtures thereof.

The salt may be present in an amount capable of, configured to, or sufficient to provide ionic conductivity. For example, the salt may be present in the hydrogel in an amount or concentration of at least 0.1M, more preferably at least 0.5M, even more preferably at least 2M, even more preferably at least 4M. The salt may be present in the hydrogel at a concentration of 10M or less, more preferably 6M or less. In another example, the salt may be present in the hydrogel in an amount of from about 3M to about 10M, about 4M to about 10M, about 5M to about 9M, or about 6M to about 8M. In an exemplary implementation, the salts included ammonium chloride and zinc chloride, where ammonium chloride is present in an amount of from about 2.5M to about 3M, about 2.8M to about 2.9M, or about 2.89M, and where zinc chloride is present in an amount of from about 0.5M to 1.5M, about 0.8M to about 1.2M, or about 0.9M.

In at least one embodiment, the electrolyte composition may include one or more additives. The one or more additives may be or include, but are not limited to, biodegradable or environmentally friendly nanomaterials. The biodegradable nanomaterials may be capable of or configured to provide and/or improve structural strength of the electrolyte layer or the electrolyte composition thereof without sacrificing flexibility of the electrolyte layer or the electrolyte composition thereof. Illustrative biodegradable nanomaterials of the additives may be or include, but are not limited to, polysaccharide-based nanomaterials, inorganic nanomaterials, or the like, or combinations thereof. Illustrative polysaccharide-based nanomaterials may be or include, but are not limited to, one or more of cellulose nanocrystals, chitin nanocrystals, chitosan nanocrystals, starch nanocrystals or the like, or combinations or mixtures thereof. Illustrative inorganic nanomaterials may be or include, but are not limited to, one or more of silicon oxides (e.g., fumed silica), aluminum oxides, layered silicates or lime, or combinations or mixtures thereof.

The one or more additives may be present in an amount of from at least 0.1 weight %, based on a total weight of the hydrogel. For example, the one or more additive may be present in an amount of at least 0.1 weight %, at least 0.5 weight %, or at least 1 weight %, based on a total weight of the hydrogel. The one or more additives may also be present in an amount of 40 weight % or less, based on a total weight of the hydrogel. For example, the one or more additives may be present in an amount of 40 weight % or less, 20 weight % or less, or 10 weight % or less, based on a total weight of the hydrogel.

In at least one embodiment, the electrolyte composition may include an aqueous solvent. For example, the electrolyte composition may include water. In at least one embodiment, the electrolyte composition may include a co-solvent. For example, the electrolyte composition may include water and an additional solvent. Illustrative co-solvents may be or include, but are not limited to, one or more of ethylene glycol, propylene glycol, diethylene glycol, dipropylene glycol, or combinations thereof. The cosolvent may include water in an amount greater than about 20%, greater than about 30%, greater than about 40%, greater than about 50% to greater than about 60%, greater than about 70%, greater than about 80%, greater than about 85%, or greater than about 90%, by total weight or volume of the aqueous solvent of the electrolyte composition.

In at least one embodiment, the electrolyte composition includes the hydrogel of the copolymer and the salt dispersed in the hydrogel, a solvent (e.g., water or water and a co-solvent), one or more photoinitiators, the optional one or more additives, or combinations thereof. For example, the electrolyte composition includes the hydrogel of the copolymer, the salt dispersed in the hydrogel, the solvent, the one or more additives, or combinations or mixtures thereof. In at least one embodiment, the electrolyte composition consists of or consists essentially of the hydrogel of the copolymer, the salt dispersed in the hydrogel, and the solvent (e.g., water or water and a cosolvent). In another embodiment, the electrolyte composition consists of or consists essentially of the hydrogel of the copolymer, the salt dispersed in the hydrogel, the solvent, and the one or more additives. The solvent, which may be water or a combination of water and a cosolvent, may provide the balance of the hydrogel. Suitable electrolyte compositions and processes and procedures for producing the same are disclosed in International Application No. PCT/US2020/046932, the disclosure of which is hereby incorporated herein by reference in its entirety.

As previously discussed, the electrolyte layer 108 of exemplary biodegradable electrochemical devices 100 may be or include the solid, aqueous electrolyte composition. The solid, aqueous electrolyte composition may have sufficient mechanical and electrochemical properties necessary for a commercial printed battery or a commercially useful printed battery. For example, the solid, aqueous electrolyte composition may have a Young's modulus or storage modulus of greater than about 0.10 Megapascals (MPa), greater than about 0.15 MPa, or greater than about 0.20 MPa, thereby providing the solid, aqueous electrolyte composition with sufficient strength while maintaining sufficient flexibility to prevent breakage under stress. The solid, aqueous electrolyte composition may have a Young's modulus of less than or equal to about 100 MPa, less than or equal to about 80 MPa, less than or equal to about 60 MPa, or less.

As used herein, the term or expression "Yield strength" may refer to a maximum stress a material can experience or receive before the material begins to deform permanently. The solid, aqueous electrolyte composition may have a Yield strength of from about 5 kPa or greater. For example, the solid, aqueous electrolyte composition may have a Yield strength of from about 5 kPa or greater, about 8 kPa or greater, about 10 kPa or greater, about 12 kPa or greater, about 15 kPa or greater, or about 20 kPa or greater.

The solid, aqueous electrolyte composition may be electrochemically stable for both the anode active layers 106 and cathode active layers 110 of exemplary biodegradable electrochemical devices 100. For example, the solid, aqueous electrolyte composition may maintain a stable open circuit voltage over an extended period of time, thereby demonstrating electrochemical stability towards both the anode active layers 106 and cathode active layers 110 of exemplary biodegradable electrochemical devices 100. In at least one embodiment, the solid, aqueous electrolyte composition may be electrochemically stable in contact with the electrode layers for at least one month, at least two months, at least three months, at least four months, at least five months, at least six months, at least one year, or more.

The solid, aqueous electrolyte composition disclosed herein may be utilized in any electrochemical device, such as an electrochemical cell, a battery, and/or the biodegradable electrochemical devices 100 disclosed herein. In a preferred embodiment, the solid, aqueous electrolyte composition may be utilized in a battery including a Zn anode active layer and a $MnO_2$ cathode active layer.

The current collectors 104, 112 of exemplary biodegradable electrochemical devices 100 may be capable of or configured to receive, conduct, and deliver electricity. Illustrative current collectors 104, 112 may be or include, but are not limited to, silver, such as silver microparticles and silver nanoparticles, carbon, such as carbon black, graphite, carbon fibers, carbon nanoparticles, such as carbon nanotubes, graphene, reduced graphene oxide (RGO), or the like, or any combination thereof.

Figure 2:
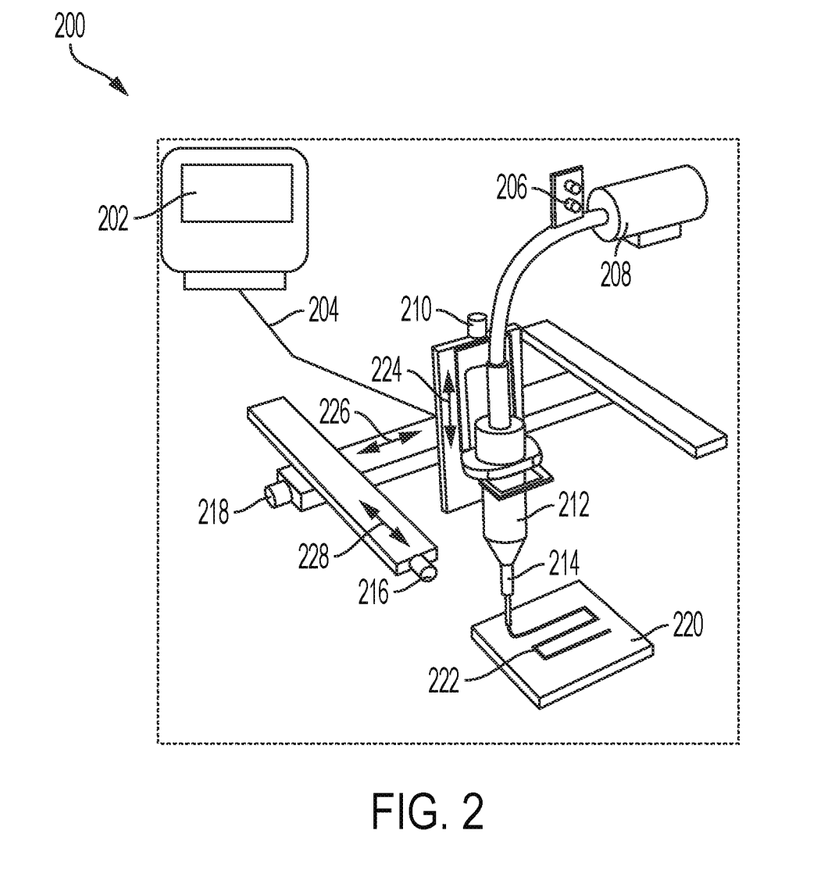
FIG. 2 illustrates a schematic view of an extrusion device capable of dispensing a gel polymer electrolyte layer for an electrochemical device, in accordance with the present disclosure.

FIG. 2 illustrates a schematic view of an extrusion device capable of dispensing a gel polymer electrolyte layer for an electrochemical device, in accordance with the present disclosure. While this is an example schematic view of an extrusion device 200 suitable for dispensing a gel polymer electrolyte layer for an electrochemical device, other means of dispensing a gel polymer electrolyte layer in accordance with the present disclosure may be employed. The extrusion device 200 includes a computer processing unit 202 capable of communicating directions to the remainder of the extrusion device 200 via a communication wire 204. The extrusion device 200 includes a pressure or flow controller 206 used to regulate either air or material flow into a pump 208, which is connected to a dispensing head 212 and delivers material, such as a gel polymer electrolyte, thereto. The dispensing head 212 has a nozzle 214, through which material is delivered to a substrate 220. Depending upon the instructions, including flow rate of material, patterning of the dispensed material, or other instructions received from the computer processing unit 202, An x-axis motor 218, y-axis motor 216, and z-axis motor 210 translate the substrate and/or the dispensing head 212 along an x-axis movement 226, y-axis movement 228, and z-axis movement 224, respectively. This movement and the instructions received from the computer processing unit 202 provide a desired pattern and quantity of a deposited or dispensed gel polymer electrolyte 222 upon the substrate 220.

Figure 3:
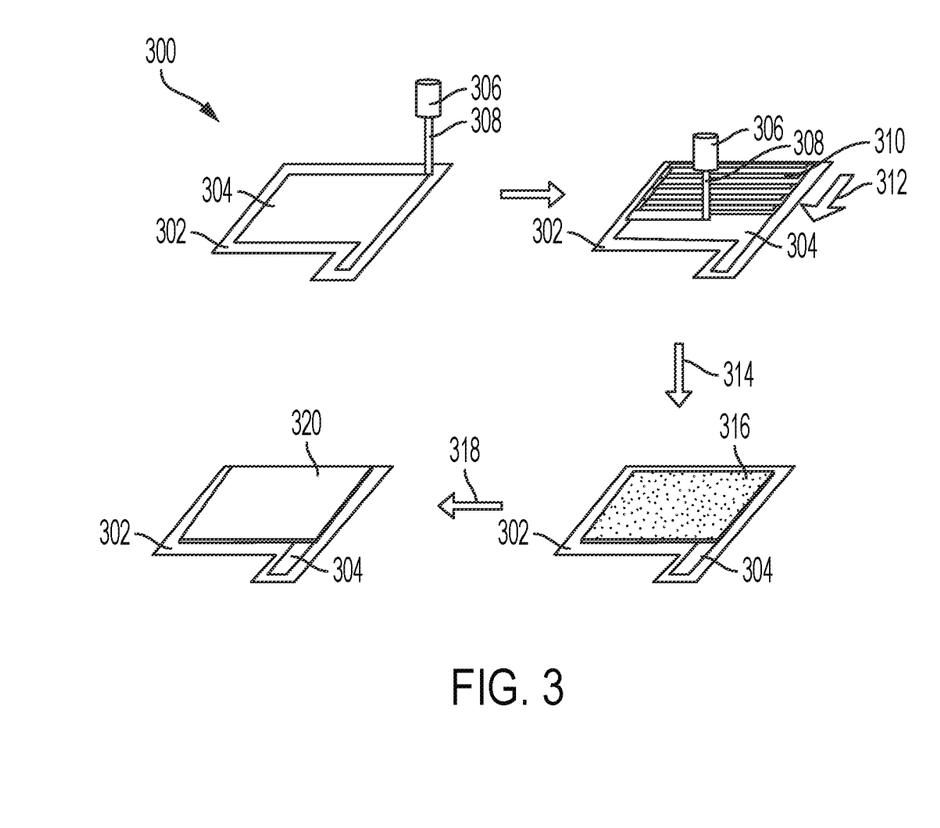
FIG. 3 illustrates a schematic of a process for providing a gel polymer electrolyte layer for an electrochemical device, in accordance with the present disclosure.

Exemplary examples of the present disclosure may provide methods for fabricating an electrochemical device, and in particular, providing gel polymer electrolyte layer for an electrochemical device. FIG. 3 illustrates a schematic of a process for providing a gel polymer electrolyte layer for an electrochemical device, in accordance with the present disclosure. The process for providing a gel polymer electrolyte layer for an electrochemical device 300 includes providing a substrate 302 having a current collector 304, which may include an anode or a cathode depending on the order of fabrication of the electrochemical device, attached thereto. A dispensing nozzle 306 provides a stream of gel polymer electrolyte 308 in a predetermined pattern onto a surface of the current collector 304. The pattern may be continuous or non-continuous in examples. A layer of deposited gel polymer electrolyte 310 is dispensed in a pattern and may be applied in a direction of patterning or deposition of gel polymer electrolyte 312 across the surface of the current collector 304. The deposited gel polymer electrolyte 308 is allowed to settle and level during a coalescence step 314. A layer of coalesced gel polymer electrolyte 316 is then present on a surface of the current collector 304, while leaving a portion of the current collector 304 exposed for connection or continuity between internal components of the electrochemical device and external components, connections, or other electrochemical devices. During a curing process step 318, the layer of coalesced gel polymer electrolyte 316 is transformed into a cured gel polymer electrolyte composition layer 320. Curing may be accomplished by a number of means, including ultraviolet or other radiation exposure. Curing may alternatively be accomplished by infrared radiation, heat exposure, or exposure to elevated temperature in combination with a crosslinker or crosslinking molecule. The layer of deposited gel polymer electrolyte 310 may be dispensed in a pattern or deposition of gel polymer electrolyte 312 across the surface of the current collector 304 in a laterally non-continuous pattern. A laterally non-continuous pattern of the electrolyte layer refers to a pattern having features or physical contact points that do not necessarily contact one another within a lateral plane consistent with the construction of the electrochemical device. This laterally non-continuous pattern provides the possibility to isolate or direct the location of electrolyte placement and therefore activity, enabling a fabrication method providing for multiple electrochemical device structures to be manufactured continuously. Patterns may also be deposited in a variable manner from one electrochemical device to another, when the gel polymer electrolyte is fabricated or deposited in such a manner as described. Optional crosslinkers may include water soluble acrylates, such as PEG-diacrylate, and EOTMPTA (ethoxylated trimethylolpropane triacrylate).

An exemplary formulation of gel polymer electrolyte may include the following composition. A gel polymer electrolyte composition was prepared in water, as shown in Table 1

TABLE 1

| Gel Polymer Electrolyte composition | | |
|---|---|---|
| Component | Mass (g) | % by weight |
| GPE polymer | 18 | 31.0 |
| Electrolyte (salt in water) | 40 | 68.9 |
| LAP (photoinitiator) | 0.04 | 0.06 |
| TOTAL | 58.04 | 100.0 |

Figure 4:
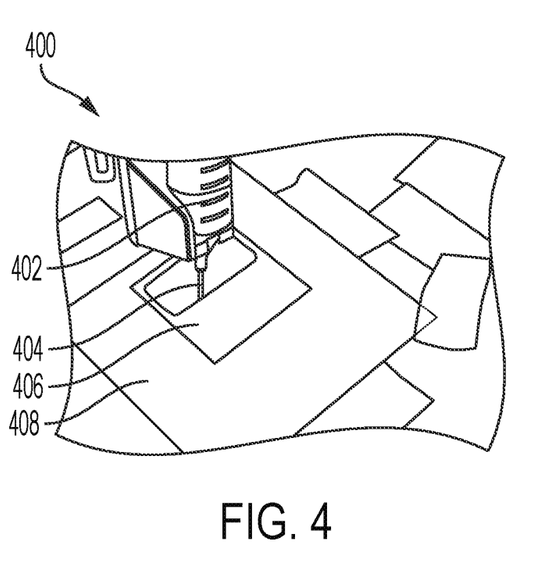
FIG. 4 is a photograph of an extruded gel polymer electrolyte layer for an electrochemical device, in accordance with the present disclosure.

The GPE polymer is a graft polymer with the generic structure shown below:

An exemplary example of a GPE polymer is a PVA main polymer chain, with PCL side pendant groups or side chains as shown in the structure below:

FIG. 4 is a photograph of an extruded gel polymer electrolyte layer for an electrochemical device, in accordance with the present disclosure. The photograph 400 illustrates a process utilizing a system similar to the extrusion device of FIG. 2. As shown, a dispensing head 402 having a dispensing nozzle 404 is shown during a process of depositing a gel polymer electrolyte 406 onto a substrate 408, in accordance with the methods, procedures, and materials of the present disclosure. An exemplary example of a gel extrusion as depicted in FIG. 4 may be carried out using a Hyrel Hydra 16A 3D printer, which is capable of operating a variety of print heads to dispense different types of materials, such as but not limited to filaments, pastes, and the like. For example, an SDS-10 print head which uses a 10 ml disposable syringe for dispensing material is placed into a slot on the tool yoke of the printer. An aqueous solution of a formulation as noted in Table 1, utilizing a UV-curable GPE (gel polymer electrolyte) is then loaded into the 10 ml syringe with 0.8 mm diameter Luer lock tip and the syringe loaded into the SDS-10 print head. Syringes, assemblies or print heads using larger volumes, integrated heating, or UV cross linking print heads are also available for use in similar methods. A simple solid fill to be printed is constructed used OpenScad software to create the 3D object and export to an STL file format, although any such program known in the art may be used. The object dimensions shown in FIG. 4 are 38 mm by 40 mm inner wall, and 0.5 mm high. Additional parameters used were the generation of g-code using Slic3r slicing software with mostly default parameters. Printing speed was set to 10 mm/s, layer height to 0.5 mm and 100% infill for the example in FIG. 4.

One or more exemplary methods in accordance with the present disclosure may be used to produce portions of or complete biodegradable electrochemical devices as disclosed herein. The methods according to the present disclosure may include providing a biodegradable substrate. The methods may also include depositing an electrode and/or electrode composition adjacent or on the biodegradable substrate. Depositing the electrode may include depositing and drying a current collector of the electrode, and depositing and drying an active layer (i.e., anode or cathode material) adjacent or on the current collector. The method may also include drying the electrode and/or electrode composition. The electrode composition may be dried thermally (e.g., heating). The method may also include depositing a biodegradable, radiatively curable electrolyte composition on or adjacent the electrode composition. The method may further include radiatively curing the biodegradable radiatively curable electrolyte composition. The biodegradable radiatively curable electrolyte composition may be radiatively cured before or subsequent to drying the electrode composition. The biodegradable substrate may be thermally compatible with the optional thermal drying. For example, the biodegradable substrate may be dimensionally stable (e.g., no buckling and/or curling) when thermally drying. The method may include depositing a second electrode and/or electrode composition on or adjacent the biodegradable, radiatively curable electrolyte composition. In at least one embodiment, each of the first and second electrode compositions is a metal foil composition. The metal foil composition of the first electrode may be different from the metal foil composition of the second electrode.

In at least one example, the electrochemical device, all of the components thereof, or substantially all of the components thereof are fabricated via a printing process. The printing process may include depositing, stamping, spraying, sputtering, jetting, coating, layering, or the like. For example, the one or more current collectors, the one or more electrode compositions, the biodegradable, radiatively curable electrolyte composition, or combinations thereof may be deposited via the printing process. Illustrative printing processes may be or include, but are not limited to, one or more of screen printing, inkjet printing, flexography printing (e.g. stamps), gravure printing, off-set printing, airbrushing, aerosol printing, typesetting, roll-to-roll methods, or the like, or combinations thereof. In a preferred embodiment, the components of the electrochemical device are printed via screen printing.

In at least one example, radiatively curing the biodegradable radiatively curable electrolyte composition includes exposing the electrolyte composition to a radiant energy. The radiant energy may be ultraviolet light. Exposing the biodegradable radiatively curable electrolyte composition to the radiant energy may at least partially crosslink the biodegradable radiatively curable electrolyte composition, thereby forming a hydrogel. The biodegradable radiatively curable electrolyte composition may be radiatively cured at room temperature. In at least one embodiment, the biodegradable radiatively curable electrolyte composition is cured at an inert atmosphere. For example, the biodegradable radiatively curable electrolyte composition may be cured under nitrogen, argon, or the like. In another embodiment, the biodegradable radiatively curable electrolyte composition may be cured in a non-inert atmosphere.

In at least one example, the biodegradable radiatively curable electrolyte composition may be radiatively cured in a period of time from about 5 ms to about 100 ms. For example, the biodegradable radiatively curable electrolyte composition may be radiatively cured in a period of time from about 5 ms, about about 10 ms, about 15 ms, about 20 ms, about 30 ms, about 40 ms, or about 50 ms to about 60 ms, about 70 ms, about 80 ms, about 85 ms, about 90 ms, about 95 ms, or about 100 ms. The period of time sufficient to radiatively cure the biodegradable radiatively curable electrolyte composition may be at least partially determined by a power output of the UV light.

In at least one example, the method may also include depositing an adhesive, such as a biodegradable adhesive, to thereby provide one or more seals of an exemplary biodegradable electrochemical device. For example, the method may include depositing a layer of the adhesive to couple the substrates or part of the substrates (e.g., area around the tabs), of the electrochemical device with one another. In some examples, the adhesive may be a hot-melt adhesive. In another example, the electrochemical device may be free or substantially free from any adhesive. For example, the biodegradable substrate may be weldable and/or heat-sealable without the use of an additional adhesive.

In at least one example, the biodegradable substrate may be a continuous web, or may be supported by a continuous web. As used herein, the term "web" may refer to a moving supporting surface, such as a conveyor belt. In at least one example, a plurality of electrochemical devices are simultaneously printed as independent or linked elements or components on the continuous web. For example, respective components of the plurality of electrochemical devices may be simultaneously printed as independent or linked components on the continuous web as an array in a parallel process. As used herein, the term or expression "linked elements" or "linked components" may refer to elements or components, respectively, of the electrochemical device that are physically touching, overlapping, or otherwise contacting one another. Illustrative linked elements may be or include an active layer (e.g., cathode active layer or anode active layer) disposed adjacent to or on top of a current collector layer, a current collector layer and a copper tape tab, or an electrolyte layer on top of an active cathode/anode layer.

In at least one example of an exemplary biodegradable electrochemical device, the solid aqueous electrolytes thereof, and methods for synthesizing and fabricating the same are available, the layers of various materials, including current collectors, cathode/anode materials, binders, adhesives, and electrolyte need to be printed with high fidelity and accuracy. Furthermore, retention of moisture within the aqueous electrolyte is critical to battery performance via maintenance of solubilized salts for good ion conductivity and printed biodegradable or compostable batteries such as these suffer from shortened lifespan due to water losses via evaporation through the biodegradable substrate, which may be a polylactic acid (PLA) film. Such electrochemical devices may have biodegradable polymeric composite film enclosure pouches that have a biodegradable barrier layer. Illustrative biodegradable enclosure materials may be or include, but are not limited to, one or more of polylactic acid (PLA), polylactic-co-glycolic acid (PLGA), silk-fibroin, chitosan, polycaprolactone (PCL), polyhydroxybutyrate (PHB), rice paper, cellulose, or combinations or composites thereof.

In at least one example, flexible biodegradable electrochemical devices including an anode, a cathode and an electrolyte composition comprising a crosslinked, biodegradable polymeric material that is radiatively curable prior to being crosslinked, printed between the anode and the cathode, may have biodegradable moisture or water vapor barriers or barrier layers forming an enclosure, film or pouch around the external portion of an electrochemical device to prevent moisture present within the aqueous electrolyte materials from evaporating. In such examples, since the entire electrochemical device is biodegradable, the device may have prolonged service life due to the improved water vapor barrier or moisture barrier layer properties of the enclosure pouch and be biodegradable and/or biodegradable once its service life is over. The function of the biodegradable water vapor barrier or enclosure is to provide a moisture barrier layer to impede the evaporation of water from aqueous electrolyte compositions within the electrochemical device, thus extending service life of the electrochemical device. It should be noted, in reference to water vapor barriers or moisture barrier layers described herein, that while certain examples of electrochemical devices may have a substantial amount of water or moisture, that other solvents or evaporable materials may also be conducive to prolonged and acceptable operation of an electrochemical device enclosed within water vapor barriers of the present disclosure.

The biodegradable water vapor barrier of the respective biodegradable electrochemical devices may be stable at temperatures of from about 50° C. to about 150° C. As used herein, the term "stable" or "stability" may refer to the ability of the substrate to resist dimensional changes and maintain structural integrity when exposed to temperature of from about 50° C. to about 150° C. For example, the biodegradable water vapor barrier may be capable of or configured to maintain structural integrity with dimensional changes of less than about 20%, less than about 15%, or less than about 10% after exposure to temperatures of from about 50° C. to about 150° C. In one example, each of the biodegradable water vapor barriers may be stable (e.g., dimensional changes less than 20%) at a temperature of from about 50° C., about 60° C., about 70° C., about 80° C., about 90° C., about 100° C., or about 110° C. to about 120° C., about 130° C., about 140° C., or about 150° C. In another example, each of the biodegradable water vapor barriers may be stable at a temperature of at least 100° C., at least 105° C., at least 110° C., at least 115° C., at least 120° C., at least 125° C., at least 130° C., at least 135° C., at least 140° C., or at least 145° C. In at least one embodiment, the biodegradable water vapor barriers may be stable at temperatures of from about 50° C. to about 150° C. for a period of from about 5 min to about 60 min or greater. For example, the biodegradable water vapor barriers may be stable at the aforementioned temperatures for a period of time of from about 5 min, about 10 min, about 20 min, or about 30 min to about 40 min, about 45 min, about 50 min, about 60 min, or greater.

In at least one embodiment, the biodegradable water vapor barrier material is weldable, bondable, and/or permanently thermo-sealable without the use of an additional adhesive. For example, the biodegradable water vapor barriers described herein for electrochemical device enclosures may be weldable and/or bondable with one another without the use of the respective seals. Illustrative biodegradable water vapor barrier materials that may be weldable and/or bondable with one another may be or include, but are not limited to, thermoplastics, such as polylactic acid (PLA), polylactides modified with a nucleating agent to enhance crystallinity, polybutylene succinate (PBS), polybutylene adipate terephthalate (PBAT), blends of PLA and polyhydroxybutyrate (PHB), PHB-based blends, or the like, or combinations thereof. As used herein, the term or expression "bondable," "weldable," and/or "permanently thermo-sealable" may refer to an ability of a material (e.g., substrate) to heat seal two surfaces with one another or permanently join two surfaces with one another via heating or melting.

In some examples, the biodegradable enclosures, pouches, or water vapor barriers may be made from metallized, biodegradable polylactic acid (PLA) film, such as an aluminum metalized polylactic acid film. The metal surface layer providing the metallization may be aluminum. In certain examples, the metallization layer may include aluminum, other suitable metals or alloys, ceramics, clays, hybrid materials of inorganic-organic biopolymers, and combinations thereof. Alternative examples may have multiple layers of metal, metal on an inner layer of a multilayer film, an outer layer, or both. The PLA film may be biaxially oriented to improve physical properties of the enclosure pouch. Still other examples may have additives incorporated into the film, providing enhanced moisture barrier properties. Biodegradable enclosures, pouches, or water vapor barriers for electrochemical devices may have single layer, or multiple layers with combinations of one or more materials in alternate examples. Single layer films or barriers may have an overall thickness from about 20 microns to about 100 microns, from about 40 microns to about 80 microns, or from about 50 microns to about 75 microns. Metallized layers of water vapor barriers may have a thickness from about 0.5 nm to about 100 nm, from about 5 nm to about 50 nm, or from about 5 nm to about 25 nm over a base film layer such as PLA.

In certain example, other materials known to have water vapor barrier properties may be used. These materials must conform to the biodegradable and/or compostable format and include materials such as beeswax, plasticizers, and alternative biodegradable polymer composite films. In alternate devices wherein the water vapor barrier is not a part of the substrate of the electrochemical device, water vapor barriers may be used having higher temperature stability and resistance as compared to biodegradable materials, polymers or composites, having wider ranges of temperature resistance. Examples of electrochemical devices having biodegradable enclosures or water vapor barriers having moisture barrier properties may exhibit reduced water vapor transmission rates (WVTR) as compared to electrochemical devices without such barriers, layers, or enclosures.

In some example, the electrochemical device may be arranged such that a battery or electrochemical device is contained in an enclosure or entirely within a water vapor barrier as described having improved water vapor barrier properties and oriented or arranged such that the cathode and anode are in a side-by-side or lateral X-Y plane geometry. In alternate devices, the electrochemical device may be arranged such that a battery or electrochemical device is contained in an enclosure as described having improved water vapor barrier properties and oriented or arranged such that the cathode and anode are in a stacked geometry, as illustrated in FIG. 1.

Examples of the present disclosure may provide methods for fabricating, producing, or otherwise enclosing an electrochemical device having improved moisture barrier properties or water vapor barrier properties. The method may include orienting a first metalized PLA film having four edges and a second metalized PLA film having four edges such that a non-metalized side of the first metalized PLA film is facing a non-metalized side of the second metalized PLA film. One or more edges of the first and second metallized PLA films may be sealed together. A biodegradable or compostable electrochemical device may be placed between the first metalized PLA film and the second metalized PLA film, followed by sealing the edges of the first metalized PLA film and the edges of the second metalized PLA film together, such that one or more electrodes of the electrochemical device are exposed through at least one of four edges.

Methods may alternatively include steps to orient a first metalized PLA film having four edges on a top side of an electrochemical device such that a non-metalized side is facing the electrochemical device. A second metalized PLA film is oriented on a bottom side of an electrochemical device such that a non-metalized side is facing the electrochemical device. All four edges of the first metalized PLA film and the four edges of the second metalized PLA film may be sealed together, such that the one or more electrodes are exposed through at least one of four edges. Enclosures or water vapor barriers fabricated in this manner from biodegradable aluminized polymer barrier layers in combination with surface coatings and/or polymer additives may reduce or prevent water vapor loss from a biodegradable or compostable electrochemical device. Such devices may significantly extend the service life of biodegradable or compostable electrochemical devices by preventing the electrolyte solvent from evaporating over time.

Figure 5:
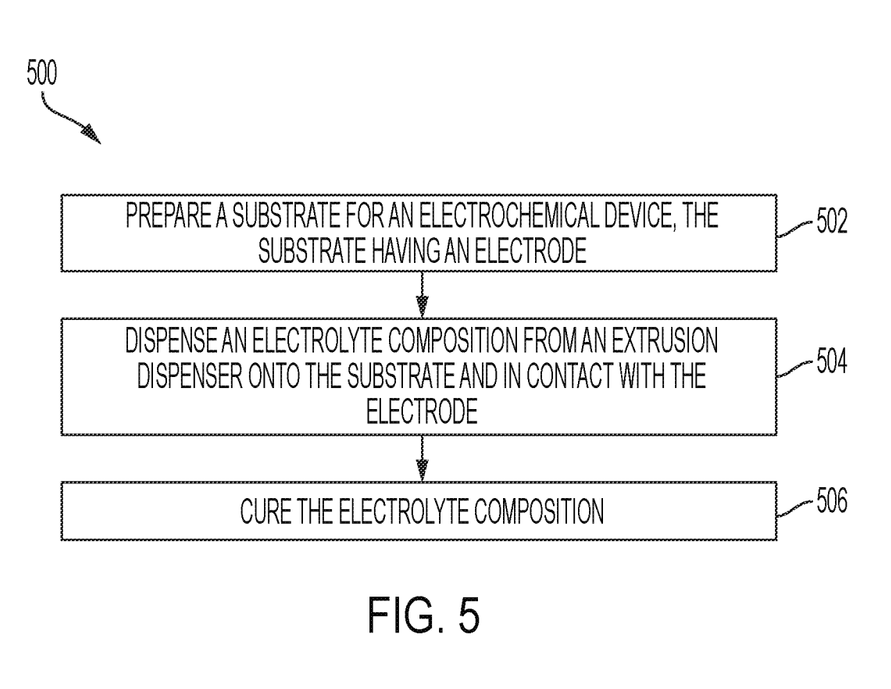
FIG. 5 illustrates a method for producing an electrolyte layer of an electrochemical device, in accordance with the present disclosure.

FIG. 5 illustrates a method for producing an electrolyte layer of an electrochemical device, in accordance with the present disclosure. A method of producing an electrolyte layer of an electrochemical device 500 includes an initial step to prepare a substrate for an electrochemical device, wherein the substrate includes an electrode 502. Next, the method of producing an electrolyte layer of an electrochemical device 500 includes dispensing an electrolyte composition from an extrusion dispenser onto the substrate and in contact with the electrode 504 and curing the electrolyte composition 506. Depending on the electrolyte composition, curing may include subjecting the electrolyte composition to ultraviolet radiation, subjecting the electrolyte composition to elevated temperature, the use of another curing method, or a combination thereof. In exemplary examples, the electrolyte composition comprises a gel polymer electrolyte, and may further include a hydrogel of a copolymer and a salt dispersed in the hydrogel of a copolymer. The electrolyte composition may alternately include a diluent to adjust a viscosity of the electrolyte composition. Illustrative examples of diluents used in the electrolyte composition may include water, or other diluents as described herein. The viscosity of the electrolyte composition used in the method of producing an electrolyte layer of an electrochemical device 500 may be from about 1,000 cP to about 100,000 cP. Other illustrative examples of electrolyte compositions may include a photoinitiator, and in some examples may include lithium phenyl-2,4,6-trimethylbenzophoosphinate. The electrolyte composition may include a first part having a binder polymer and a first portion of a diluent and a second part having a photoinitiator and a second portion of a diluent. Certain examples of electrolyte compositions used in the method of producing an electrolyte layer of an electrochemical device 500 may include a crosslinker, and therefore, the electrolyte composition may include a first part having a binder polymer and a first portion of a diluent and a second part having a crosslinker and a second portion of a diluent. The method of producing an electrolyte layer of an electrochemical device 500 may include a step to mix the electrolyte composition prior to dispensing electrolyte composition, and in some examples, with the use of a static mixer. The method of producing an electrolyte layer of an electrochemical device 500 may include dispensing the electrolyte composition according to a specific pattern. The method of producing an electrolyte layer of an electrochemical device 500 may include pausing to allow the electrolyte composition to coalesce under ambient conditions after dispensing.

Figure 6:
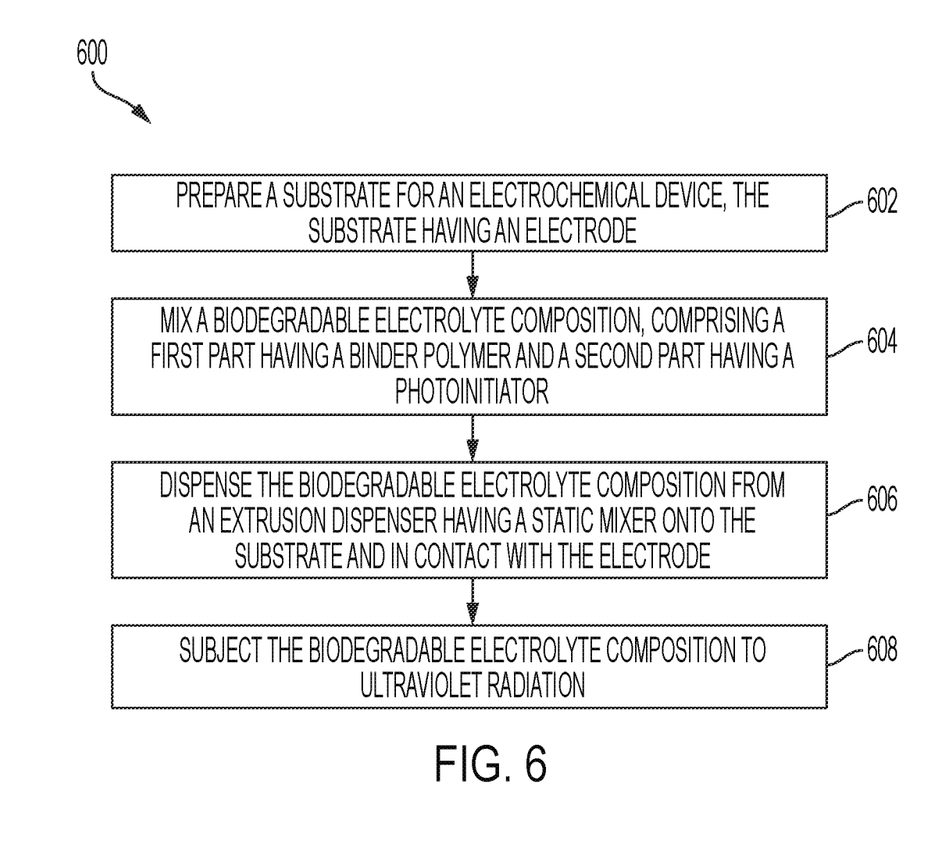
FIG. 6 illustrates a method for producing an electrolyte layer of an electrochemical device, in accordance with the present disclosure.

FIG. 6 illustrates a method for producing an electrolyte layer of an electrochemical device, in accordance with the present disclosure. A method of producing an electrolyte layer of an electrochemical device 600 begins with a step to prepare a substrate for an electrochemical device, the substrate having an electrode 602, followed by a step to mix a biodegradable electrolyte composition, comprising a first part having a binder polymer and a second part having a photoinitiator 604. The electrolyte composition may include any of the electrolyte compositions as described previously herein. The method of producing an electrolyte layer of an electrochemical device 600 also includes a step to dispense the biodegradable electrolyte composition from an extrusion dispenser having a static mixer onto the substrate and in contact with the electrode 606 and to subject the biodegradable electrolyte composition to ultraviolet radiation 608. The biodegradable electrolyte composition used in the method of producing an electrolyte layer of an electrochemical device 600 may include a biodegradable polymeric binder and an aqueous component.

Figure 7:
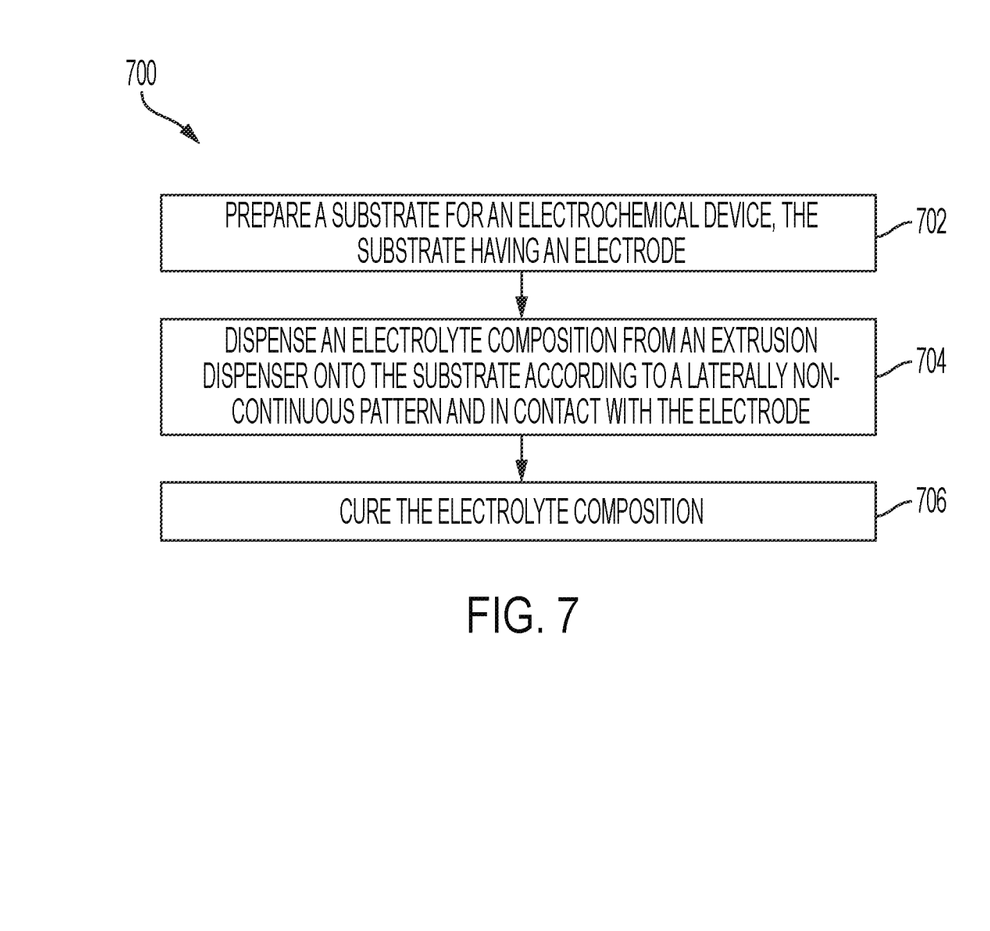
FIG. 7 illustrates a method for producing an electrolyte layer of an electrochemical device, in accordance with the present disclosure.

FIG. 7 illustrates a method for producing an electrolyte layer of an electrochemical device, in accordance with the present disclosure. A method of producing an electrolyte layer of an electrochemical device 700 includes a step to prepare a substrate for an electrochemical device, the substrate having an electrode 702, followed by a step to dispense an electrolyte composition from an extrusion dispenser onto the substrate according to a laterally non-continuous pattern and in contact with the electrode 704, and finally with a step to cure the electrolyte composition 706. A laterally non-continuous pattern of the electrolyte layer refers to a pattern having features or physical contact points that do not necessarily contact one another within a lateral plane consistent with the construction of the electrochemical device. This laterally non-continuous pattern provides the possibility to isolate or direct the location of electrolyte placement and therefore activity, enabling a fabrication method providing for multiple electrochemical device structures to be manufactured continuously.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of producing an electrolyte layer of an electrochemical device, comprising:
   preparing a substrate for an electrochemical device, the substrate comprising polylactic acid (PLA), polylactic-co-glycolic acid (PLGA), silk-fibroin, chitosan, polycaprolactone (PCL), polyhydroxybutyrate (PHB), rice paper, cellulose, polylactide polybutylene succinate (PBS), polybutylene adipate terephthalate (PBAT), or combinations thereof, and the substrate having an electrode;
   dispensing an electrolyte composition from an extrusion dispenser onto the substrate and in contact with the electrode; and
   curing the electrolyte composition; and wherein the electrolyte composition comprises:
      a photoinitiator comprising lithium phenyl-2,4,6-trimethylbenzophoosphinate.

2. The method of producing an electrolyte layer of an electrochemical device of claim 1, wherein the electrolyte composition comprises a gel polymer electrolyte, comprising a hydrogel of a copolymer and a salt dispersed in the hydrogel of a copolymer.

3. The method of producing an electrolyte layer of an electrochemical device of claim 1, wherein the electrolyte composition comprises a diluent to adjust a viscosity of the electrolyte composition.

4. The method of producing an electrolyte layer of an electrochemical device of claim 1, further comprising mixing the electrolyte composition prior to dispensing electrolyte composition.

5. The method of producing an electrolyte layer of an electrochemical device of claim 1, wherein the electrolyte composition is dispensed according to a specific pattern.

6. The method of producing an electrolyte layer of an electrochemical device of claim 1, further comprising pausing to allow the electrolyte composition to coalesce under ambient conditions after dispensing.

7. The method of producing an electrolyte layer of an electrochemical device of claim 1, wherein curing comprises subjecting the electrolyte composition to ultraviolet radiation.

* * * * *